US009672750B1

(12) United States Patent
Brantley et al.

(10) Patent No.: US 9,672,750 B1
(45) Date of Patent: Jun. 6, 2017

(54) WING PROTECTION SYSTEM

(71) Applicants: Jeffrey Lon Brantley, Guyton, GA (US); Anthony Scott Grafton, Rincon, GA (US)

(72) Inventors: Jeffrey Lon Brantley, Guyton, GA (US); Anthony Scott Grafton, Rincon, GA (US)

( * ) Notice: Subject to any disclaimer, the term of this patent is extended or adjusted under 35 U.S.C. 154(b) by 0 days.

(21) Appl. No.: 15/156,662

(22) Filed: May 17, 2016

(51) Int. Cl.
| | | |
|---|---|---|
| *G08G 5/04* | (2006.01) | |
| *G08B 23/00* | (2006.01) | |
| *B64C 3/00* | (2006.01) | |
| *B27C 5/06* | (2006.01) | |
| *B25B 5/00* | (2006.01) | |
| *B64D 47/08* | (2006.01) | |
| *B64D 47/06* | (2006.01) | |
| *G08B 7/06* | (2006.01) | |
| *H04N 7/18* | (2006.01) | |
| *G06K 9/00* | (2006.01) | |
| *H04N 5/232* | (2006.01) | |

(52) U.S. Cl.
CPC .............. *G08G 5/04* (2013.01); *B64D 47/06* (2013.01); *B64D 47/08* (2013.01); *G06K 9/0063* (2013.01); *G08B 7/06* (2013.01); *H04N 5/23238* (2013.01); *H04N 7/185* (2013.01)

(58) Field of Classification Search
CPC ..................................................... G08B 21/18
See application file for complete search history.

(56) References Cited

U.S. PATENT DOCUMENTS

| | | | | |
|---|---|---|---|---|
| 4,632,340 A | * | 12/1986 | Duea .......................... | B64C 3/58 244/1 R |
| 5,740,791 A | * | 4/1998 | Aves ......................... | A61B 1/32 128/200.26 |
| 2009/0216087 A1 | * | 8/2009 | Bjork ..................... | A61B 50/00 600/201 |
| 2013/0190604 A1 | * | 7/2013 | Moffatt ................ | A61B 5/0555 600/411 |
| 2014/0331458 A1 | * | 11/2014 | Ozawa ..................... | F16L 33/03 24/270 |

* cited by examiner

*Primary Examiner* — Joseph Feild
*Assistant Examiner* — Pameshanand Mahase (57) ABSTRACT

A wing protection system for increasing avoidance of grounded aircraft utilizes a first wing clamp and a second wing clamp to attach to an aircraft wing. The first wing clamp and the second wing clamp are connected to a central support that is used to mount and house an electronics assembly; the electronics assembly including a plurality of sensors, a processor, and a peripheral alert system. The plurality of sensors detects objects approaching the grounded aircraft, while the peripheral alert system provides a visual and audible alert to the presence of the grounded aircraft; the processor receiving signals from the plurality of sensors and dictating appropriate action of the peripheral alert system. A linear actuator is slidably coupled to the first wing clamp, allowing the wing protection system to be fitted to several types of aircraft. A surveillance camera can also be provided for video surveillance of the grounded aircraft.

18 Claims, 8 Drawing Sheets

WING PROTECTION SYSTEM

FIELD OF THE INVENTION

The present invention relates generally to aircraft avoidance. More specifically, the present invention is a wing protection system to deter vehicles from hitting an aircraft parked on a runway or in a hanger.

BACKGROUND OF THE INVENTION

Many aircraft collisions occur while an aircraft is grounded, and often times are not the fault of the aircraft, but rather are a result of personnel and vehicles running into the grounded aircraft. It is common for such collisions to involve the wings of the aircraft, as they have a smaller profile when observed straight on. Additionally, while the fuselage may be visible, it can be difficult to determine the extent to which the wings extend from the fuselage. When there is little to no light, the visibility of the aircraft wings is decreased even further, leading to a higher risk of collision with incoming objects. Even minor collision incidents can lead to costly repairs and can temporarily ground the aircraft until repairs can be made, which in the case of airline companies can lead to further costs due to flight cancellations. Thus, a collision avoidance system to deter and warn incoming objects of the presence of an aircraft in order to reduce grounded collisions is needed. Furthermore, the collision avoidance system should be readily attached and detached from the wing of an aircraft, such that no additional weight is added to the aircraft in flight, and such that the aircraft flight preparation is not drastically increased.

Therefore, it is the object of the present invention to provide a wing protection system to warn ground vehicles and personnel of the presence of a grounded aircraft. The wing protection system is attached to the wingtip, and includes a peripheral alert system that provides a visual and audible warning to deter incoming personnel and vehicles. A plurality of sensors detects the distance of incoming objects, wherein the calculated distance of the object from the wingtip determines the specific alert. As the object approaches the wingtip, a warning light changes colors according to the proximity, while an audible alarm can provide a constant or variable alert. The wing protection system is attached to the aircraft by a first wing clamp and a second wing clamp, wherein the first wing clamp is slidably coupled to a linear actuator that extends and retracts the first wing clamp. A first actuator switch and a second actuator switch operate the linear actuator. Alternatively, an activation handle having a first control and a second control can be utilized when the wing protection system is attached to a high wing. A surveillance camera can also be utilized to provide video surveillance and record any collisions.

DETAIL DESCRIPTIONS OF THE INVENTION

All illustrations of the drawings are for the purpose of describing selected versions of the present invention and are not intended to limit the scope of the present invention.

The present invention is a wing protection system to warn ground vehicles and personnel of the presence of a grounded aircraft. The present invention is positioned onto the wing of the grounded aircraft and provides visual and audible warnings as nearby objects are detected. As such, the present invention comprises a first wing clamp 1, a second wing clamp 2, a central support 3, a linear actuator 5, and an electronics assembly 4, as depicted in FIG. 1 and FIG. 4.

Together, the first wing clamp 1 and the second wing clamp 2 are utilized to attach the present invention to the wing of the grounded aircraft. In reference to FIG. 1, the first wing clamp 1 is configured to conform to the profile of the leading edge of the wing, while the second wing clamp 2 is configured to conform to the profile of the trailing edge of the wing. The first wing clamp 1 and the second wing clamp 2 extend from the central support 3 in opposite directions, wherein the first wing clamp 1 engages with the leading edge of the wing and the second wing clamp 2 engages with the trailing edge of the wing. The wing is braced by the first wing clamp 1 and the second wing clamp 2, such that the central support 3 is positioned below the wing.

Figure 1:
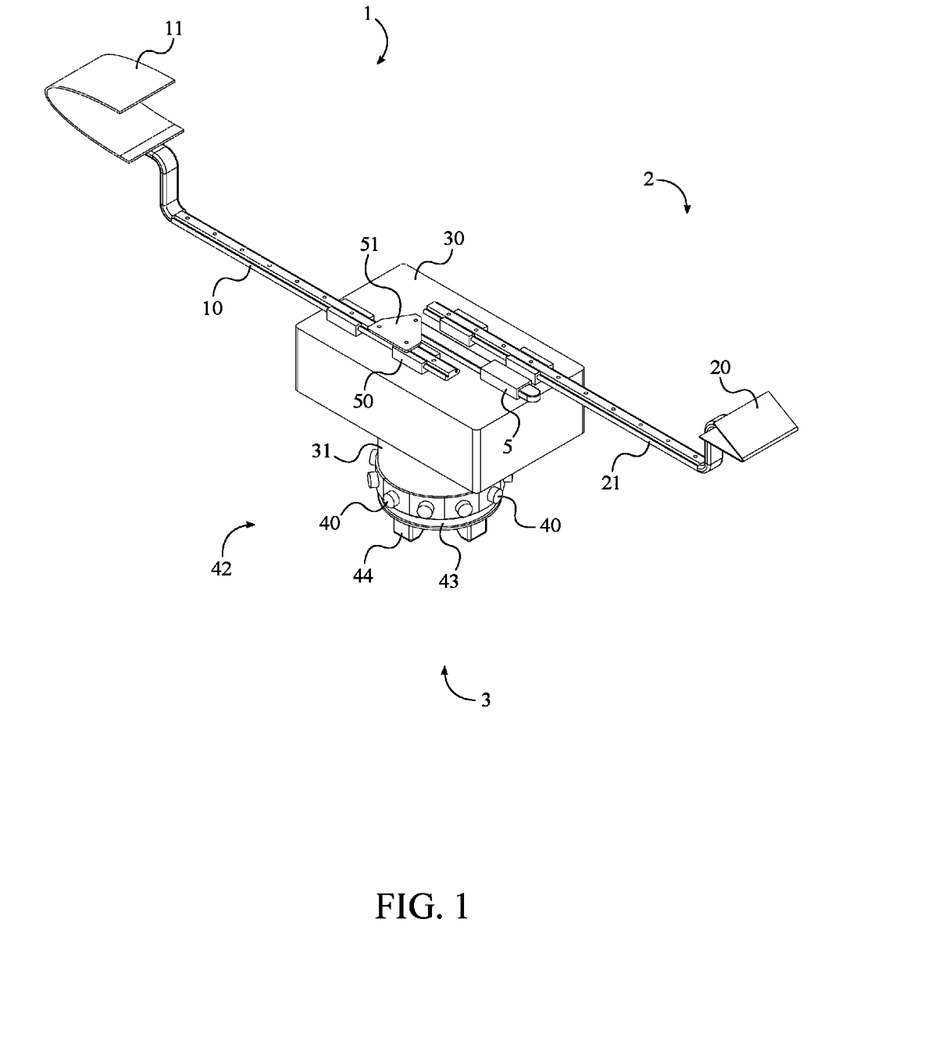
FIG. 1 is a perspective view of the present invention, wherein the first wing clamp is extended to be fitted around the wing of a grounded plane.

In further reference to FIG. 1, the central support 3 comprises a mounting plate 30 and a sensor housing 31; the first wing clamp 1, the second wing clamp 2, and the sensor housing 31 being adjacently connected to the mounting plate 30. The sensor housing 31 is positioned opposite the first wing clamp 1 and the second wing clamp 2 about the mounting plate 30, wherein the first wing clamp 1 and the second wing clamp 2 are positioned on the top of the mounting plate 30 and the sensor housing 31 is positioned on the bottom of the mounting plate 30. The sensor housing 31 extends downwards from the mounting plate 30 and is used to support components of the electronics assembly 4 that are used to detect objects approaching the wing and provide visual and audible warnings to the approaching objects.

Figure 4:
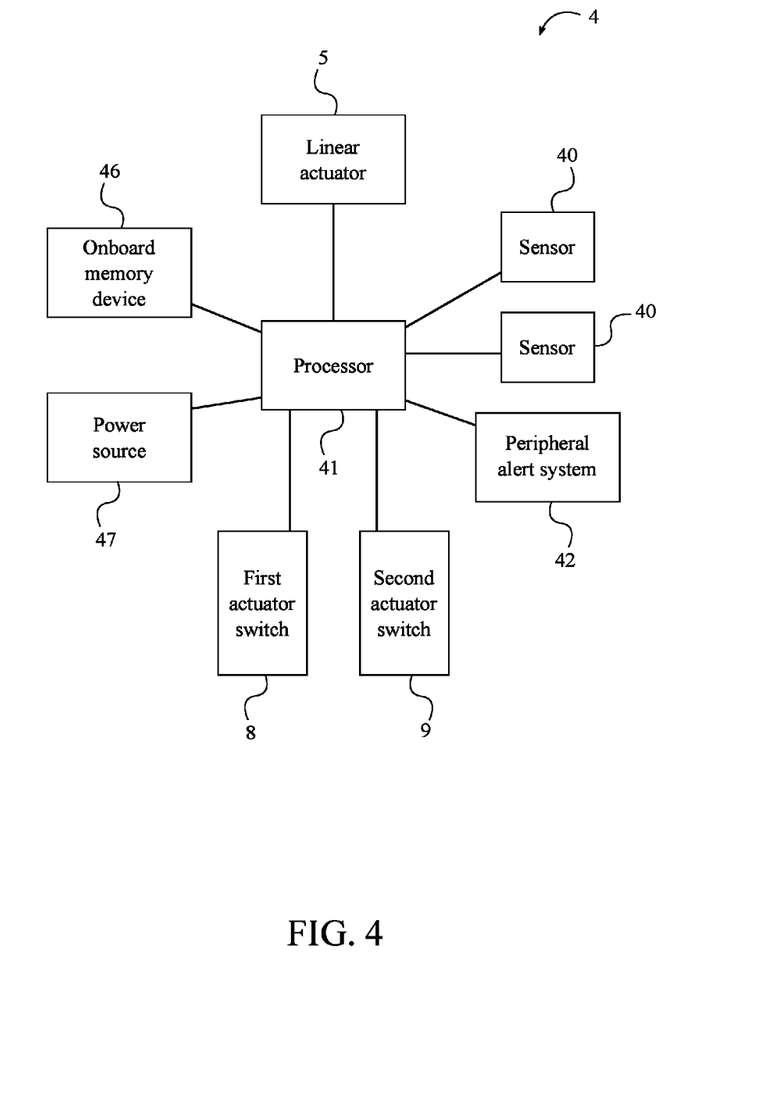
FIG. 4 is a diagram depicting the electronic connections between the processor and the first actuator switch, the second actuator switch, and the other components of the electronics assembly.

In reference to FIG. 1 and FIG. 4, the electronics assembly 4 comprises a plurality of sensors 40, a processor 41, and a peripheral alert system 42. The plurality of sensors 40 is utilized to detect the approaching objects, while the peripheral alert system 42 is utilized to provide warning signals to the approaching objects. Both the plurality of sensors 40 and the peripheral alert system 42 are electronically connected to the processor 41; the processor 41 being an intermediary to the plurality of sensors 40 and the peripheral alert system 42. The processor 41 receives signals from the plurality of sensors 40 and interprets the signals in order to determine the appropriate response signals to send to the peripheral alert system 42 in order to carry out the corresponding warning signal.

Each of the plurality of sensors 40 is a distance measuring sensor that is used to constantly observe the area surrounding the wing. The plurality of sensors 40 is positioned opposite the mounting plate 30, along the sensor housing 31, such that the plurality of sensors 40 is extended away from the wing. In the preferred embodiment of the present invention, the plurality of sensors 40 is specifically eleven sensors, wherein the plurality of sensors 40 is radially positioned around the sensor housing 31 providing 360 degrees of coverage, as depicted in FIG. 1. In another embodiment, the plurality of sensors 40 is specifically three sensors, wherein each of the plurality of sensors 40 is positioned at a 90-degree interval to provide 270 degrees of coverage.

In reference to FIG. 1, the peripheral alert system 42 is positioned opposite the mounting plate 30 along the sensor housing 31, wherein the peripheral alert system 42 is positioned adjacent to the plurality of sensors 40. Alternatively, the peripheral alert system 42 can be positioned adjacent to the mounting plate 30. The peripheral alert system 42 is used to warn approaching vehicles, personnel, etc. of the presence of the grounded aircraft in order to prevent a collision. The processor 41 receives signals from the plurality of sensors 40 and analyzes the incoming data to determine the distance of the approaching objects. The processor 41 then determines an appropriate warning level and communicates the warning level with the peripheral alert system 42, wherein the peripheral alert system 42 emits a corresponding warning signal. The peripheral alert system 42 includes a warning light 43 for providing visual warnings and an audible alarm 44 for providing audible warnings.

In the preferred embodiment of the present invention, the warning light 43 is capable of emitting three different colors of light. Each of the three colors corresponds to a different object range; a first color for a first object range, a second color for a second object range, and a third color for a third object range. The first object range is the outermost radial area around the sensor housing 31 within which approaching objects are warned. When an object is within the first object range, the first color is displayed. The second object range is an intermediary radial area between the first object range and the third object range. When an object is within the second object range, the second color is displayed. Finally, the third object range is the innermost radial area around the sensor housing 31. When an object is within the third object range, the third color is displayed.

In the preferred embodiment of the present invention, the first color is green, the second color is yellow, and the third color is red. The warning light 43 is configured to flash, or pulse, the first color, the second color, and the third color rather than provide constant illumination. As an approaching object enters and passes through the first object range, the warning light 43 flashes green; as the approaching object enters and passes through the second object range, the warning light 43 flashes yellow; as the approaching object enters and passes through the third object range, the warning light 43 flashes red. In other embodiments of the present invention, it is possible for the first color, the second color, and the third color to be different colors, and is possible for the warning light 43 to be steady. Additionally, the exact distance for each of the first object range, the second object range, and the third object range may vary between embodiments.

The audible alarm 44 is operated in conjunction with the warning light 43, wherein the audible alarm 44 produces a warning sound to alert approaching personnel of the presence of the grounded aircraft. The audible alarm 44 can be a horn, speaker, or any other device capable of producing an audible alert at an acceptable decibel level. The audible alarm 44 may emit a constant or intermittent sound. If the audible alarm 44 is configured to be intermittent, the audible alarm 44 can be synched with the warning light 43, such that the audible alarm 44 emits sounds as the warning light 43 emits light, or such that the audible alarm 44 emits sound in between the flashes of light emitted from the warning light 43.

The present invention is attached to the wing of the grounded aircraft via the first wing clamp 1 and the second wing clamp 2, wherein first wing clamp 1 and the second wing clamp 2 are positioned opposite each other across the mounting plate 30. More specifically, the present invention is attached to the wingtip. In reference to FIG. 1, the first wing clamp 1 comprises a first arm 10 and a first clamp 11, while the second wing clamp 2 comprises a second arm 20 and a second clamp 21. The first arm 10 and the second arm 20 are positioned along the mounting plate 30, wherein the first arm 10 and the second arm 20 are positioned parallel to each other. In the preferred embodiment of the present invention, the first arm 10 and the second arm 20 are connected to the top of the mounting plate 30, however, in other embodiments, the first arm 10 and the second arm 20 may be positioned into the mounting plate 30. A linear actuator 5 is utilized to extend and retract the first arm 10 in order to position the present invention around the wing of the grounded aircraft.

In further reference to FIG. 1, the first arm 10 is an elongated structure with a 90-degree bend, such that the first arm 10 extends away from the mounting plate 30 in two directions; out in front of the mounting plate 30 and up above the mounting plate 30. The first clamp 11 is terminally connected to the first arm 10 opposite the mounting plate 30, such that the first clamp 11 is positioned above and in front of the mounting plate 30. As such, the first clamp 11 is configured to receive the leading edge of the wing. Similar to the first arm 10, the second arm 20 is an elongated structure with a 90-degree bend, such that the second arm 20 extends away from the mounting plate 30 in two directions; out behind the mounting plate 30 and up above the mounting plate 30. The second clamp 21 is terminally connected to the second arm 20 opposite the mounting plate 30, such that the second clamp 21 is positioned above and behind the mounting plate 30. As such, the second clamp 21 is configured to receive the trailing edge of the wing.

Figure 2:
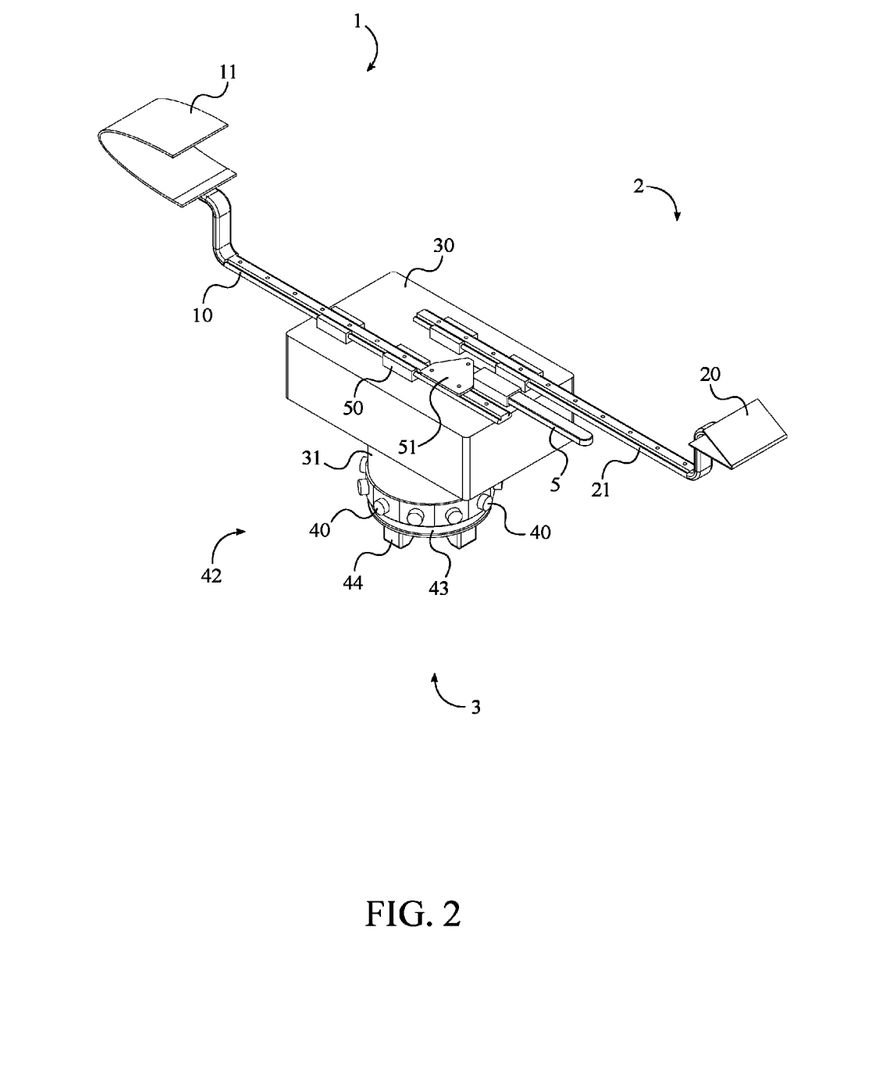
FIG. 2 is a perspective view of the present invention, wherein the first wing clamp is retracted to secure the present invention to the wing of the grounded plane.

In the preferred embodiment of the present invention, the linear actuator 5 only activates the first wing clamp 1, wherein the first wing clamp 1 is slidably coupled with the linear actuator 5; the linear actuator 5 being used to adjust the distance of the first clamp 11 from the leading edge of the wing by sliding the first arm 10, as depicted in FIG. 1-2. The first arm 10 is slidably positioned within a linear sleeve bearing 50 that retains the first arm 10 in a position parallel to the second arm 20. A coupler 51 is adjacently connected to the linear actuator 5 and the first arm 10, wherein the linear movement of the linear actuator 5 is translated to the first arm 10 through the coupler 51. As the linear actuator 5 is activated, the first arm 10 slides within the linear sleeve bearing 50, as depicted in FIG. 1-2, to either expand or contract the first clamp 11 in relation to the leading edge of the wing. In other embodiments of the present invention, other devices may be used to linearly move the first arm 10, such as a gear motor and tooth track integrated into either the first arm 10 or the second arm 20. Furthermore, it is also possible for the second wing clamp 2 to be actuated in addition to or in place of the first wing clamp 1.

Figure 3:
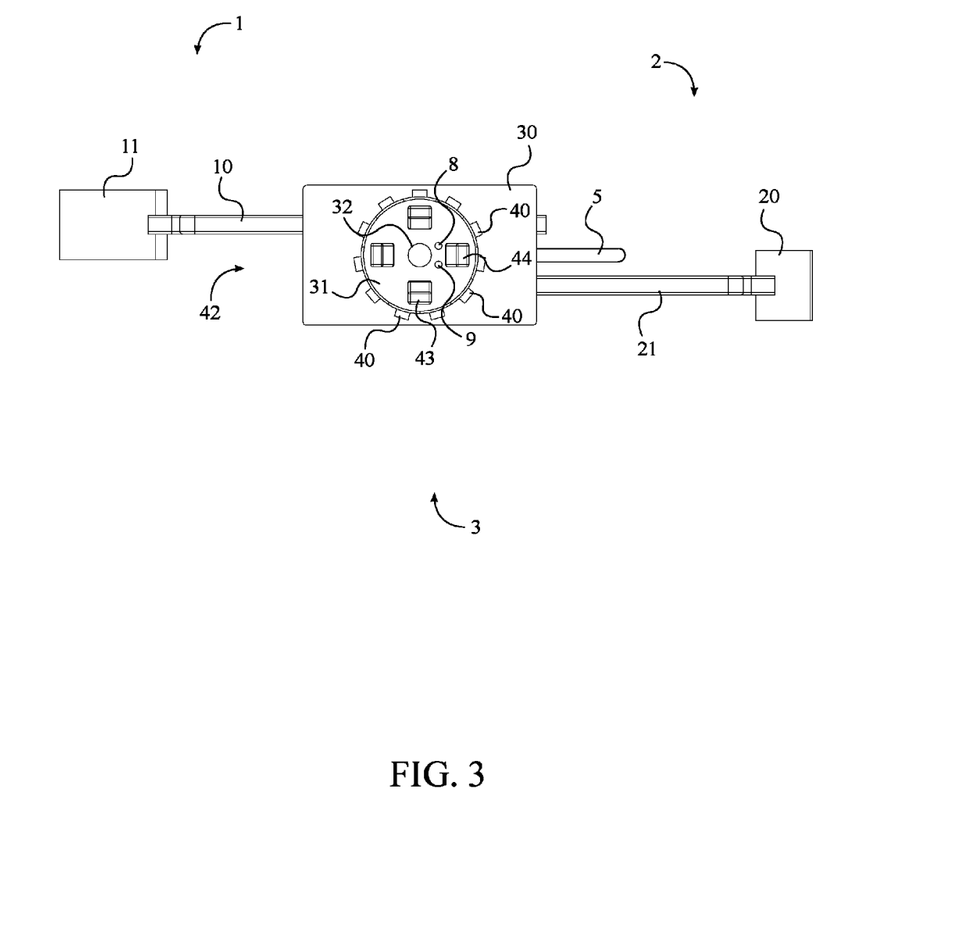
FIG. 3 is a bottom plan view of the present invention, detailing the positions of the adapter slot, the first actuator switch, and the second actuator switch.

To install the present invention, the second clamp 21 is positioned around the trailing edge, wherein the wing is fit snuggly within the second clamp 21. The linear actuator 5 is then utilized to contract the first wing clamp 1 towards the second wing clamp 2, until the first clamp 11 engages the leading edge, wherein the wing is fit snuggly within the first clamp 11. In order to activate the linear actuator 5, the present invention further comprises a first actuator switch 8 and a second actuator switch 9 as depicted in FIG. 3. In reference to FIG. 4, the first actuator switch 8 and the second actuator switch 9 are electronically connected to the processor 41, along with the linear actuator 5, wherein engagement of the first actuator switch 8 and the second actuator switch 9 instructs the processor 41 to control the movement of the linear actuator 5. While the first actuator switch 8 and the second actuator switch 9 are used to control movement of the linear actuator 5 in opposite directions in the preferred embodiment, it is also possible for a single actuator switch to control movement of the linear actuator 5 in both directions.

The first actuator switch 8 is utilized to contract the first wing clamp 1 towards the second wing clamp 2, while the second actuator switch 9 is utilized to expand the first wing clamp 1 away from the second wing clamp 2. The first actuator switch 8 and the second actuator switch 9 can be any type of switch, such as a flip switch, push button, etc. Both the first actuator switch 8 and the second actuator switch 9 are mounted to the sensor housing 31 and positioned on the sensor housing 31 opposite the mounting plate 30 as depicted in FIG. 3, such that the first actuator switch 8 and the second actuator switch 9 are readily accessible to the user. When the first actuator switch 8 is engaged by the user, the processor 41 controls the linear actuator 5 to contract the first wing clamp 1 towards the second wing clamp 2. Meanwhile, when the second actuator switch 9 is engaged by the user, the processor 41 controls the linear actuator 5 to expand the first wing clamp 1 away from the second wing clamp 2.

Figure 5:
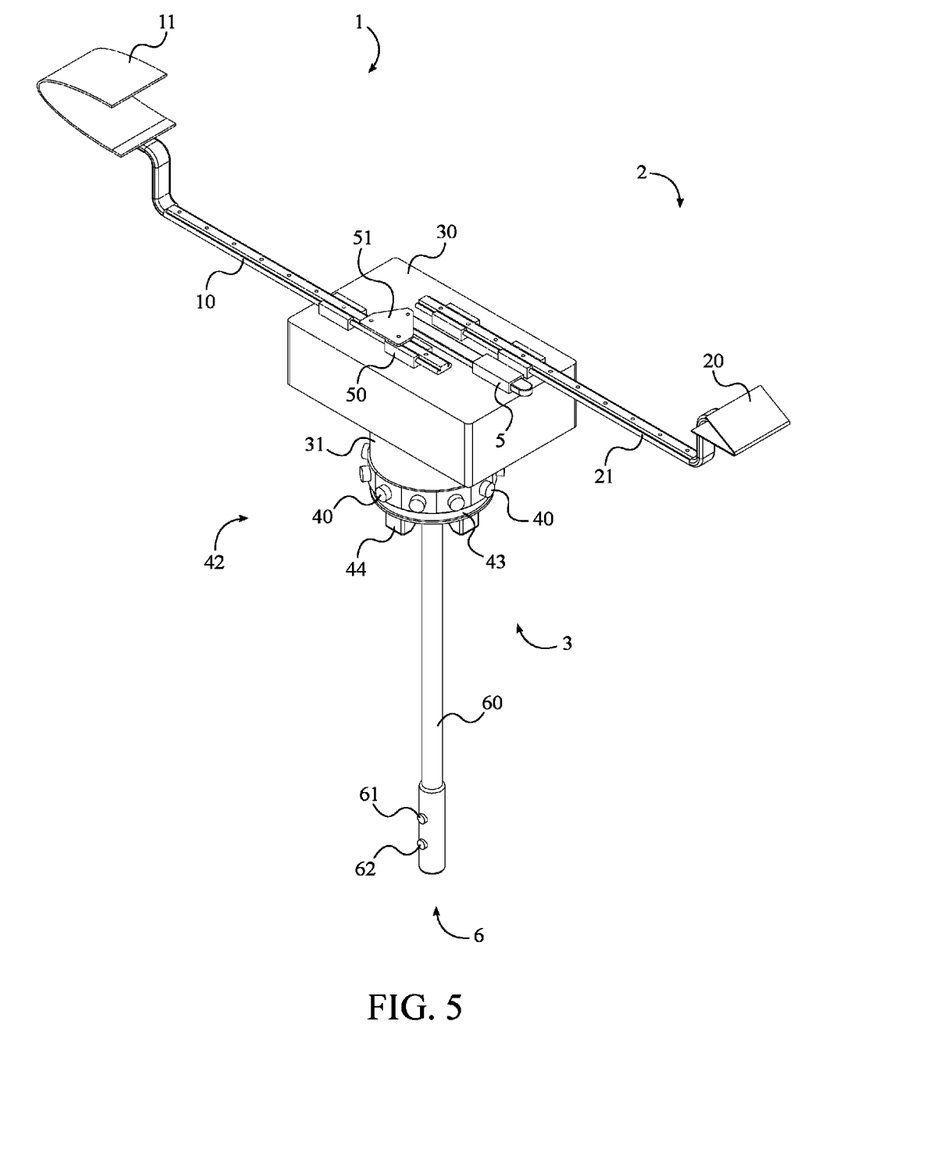
FIG. 5 is a perspective view of the present invention, wherein the activation handle is positioned into the adapter slot.
Figure 6:
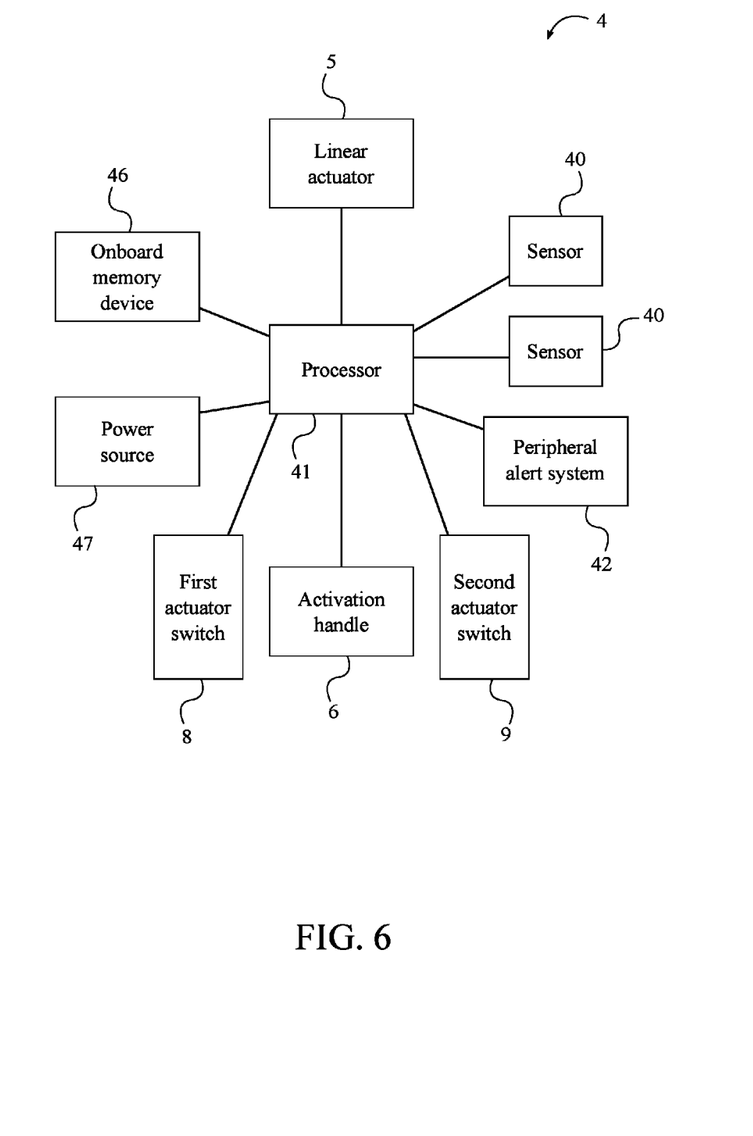
FIG. 6 is a diagram depicting the electronic connections between the processor and the activation handle, the first actuator switch, the second actuator switch, and the other components of the electronics assembly.

In reference to FIG. 5, the present invention may further comprise of an activation handle 6 that can be used in conjunction with or in place of the first actuator switch 8 and the second actuator switch 9. The activation handle 6 comprises a shaft 60, a first control 61, and a second control 62; the first control 61 and the second control 62 providing the same function as the first actuator switch 8 and the second actuator switch 9 respectively. The activation handle 6 provides an extension that allows the linear actuator 5 to be activated when the present invention is attached to higher aircraft wing, wherein the first actuator switch 8 and the second actuator switch 9 would be out of reach of the user. In such an embodiment, the sensor housing 31 further comprises an adapter slot 32, as depicted in FIG. 3, that is positioned on the bottom of the sensor housing 31, opposite the mounting plate 30. The activation handle 6 is positioned into the adapter slot 32, wherein the activation handle 6 is electronically connected to the processor 41 as depicted in FIG. 6.

More specifically, the shaft 60 is positioned into the adapter slot 32, wherein the first control 61 and the second control 62 are electronically connected to the processor 41. Similar to the first actuator switch 8 and the second actuator switch 9, engagement of the first control 61 and the second control 62 instructs the processor 41 to control the movement of the linear actuator 5. The first control 61 and the second control 62 are integrated into the shaft 60 opposite the adapter slot 32, such that the first control 61 and the second control 62 are readily accessible to the user. When the first control 61 is engaged by the user, the processor 41 controls the linear actuator 5 to contract the first wing clamp 1 towards the second wing clamp 2. Meanwhile, when the second control 62 is engaged by the user, the processor 41 controls the linear actuator 5 to expand the first wing clamp 1 away from the second wing clamp 2.

Figure 7:
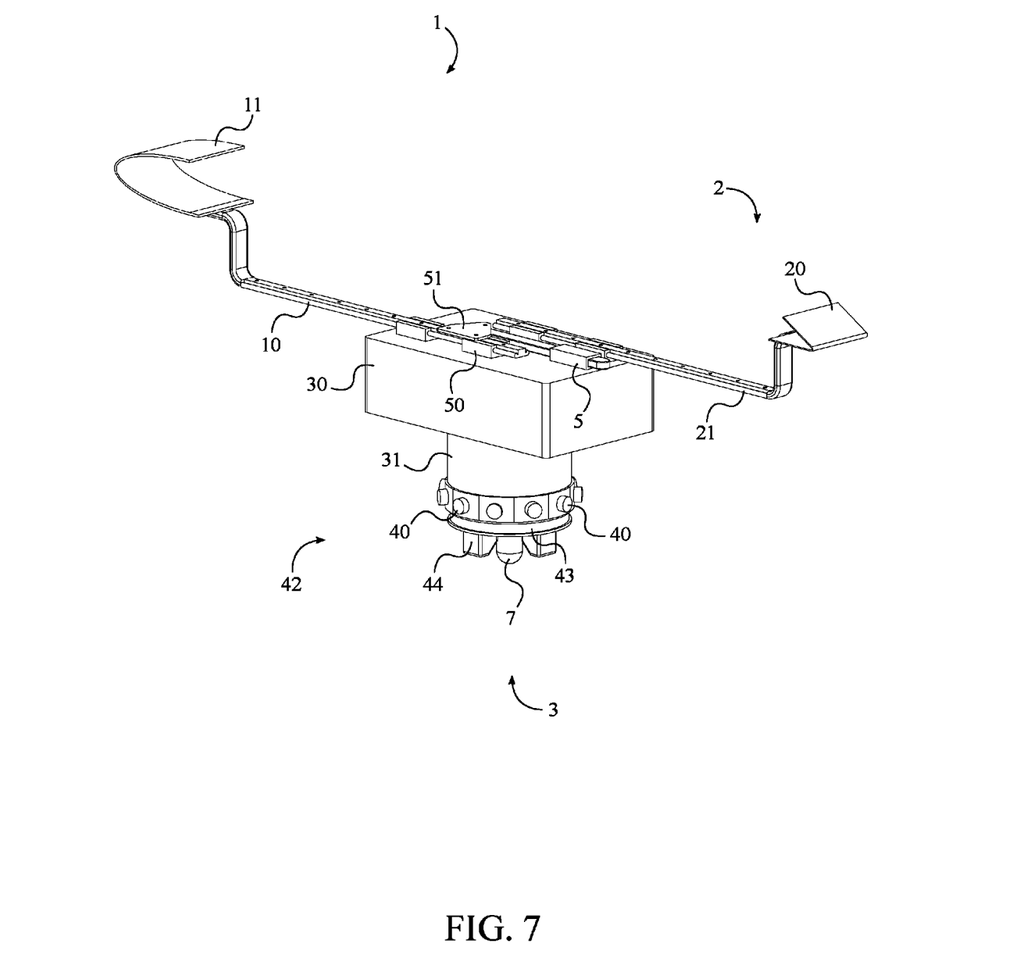
FIG. 7 is a perspective view of the present invention, wherein the surveillance camera is positioned into the adapter slot.
Figure 8:
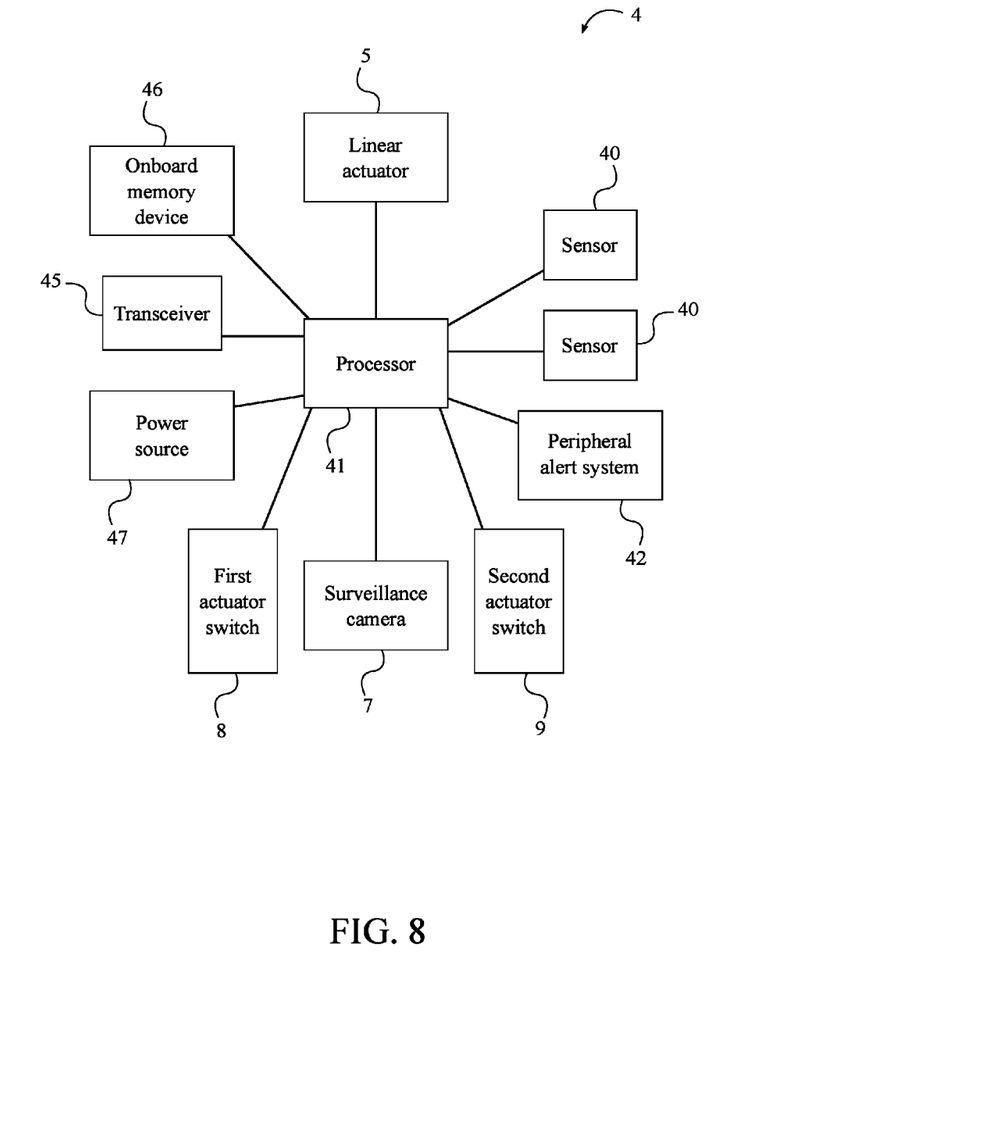
FIG. 8 is a diagram depicting the electronic connections between the processor and the surveillance camera, the first actuator switch, the second actuator switch, and the other components of the electronics assembly.

In reference to FIG. 7, the adapter slot 32 can also be used to retain a surveillance camera 7 when the activation handle 6 is removed. Similar to the activation handle 6, the surveillance camera 7 is positioned into the adapter slot 32, wherein the surveillance camera 7 is electronically connected to the processor 41 as depicted in FIG. 8. The processor 41 receives video surveillance data that is captured by the surveillance camera 7 and stores the video surveillance data on an onboard memory device 46, wherein the onboard memory device 46 is electronically connected to the processor 41. In the preferred embodiment of the present invention, the surveillance camera 7 is a 360-degree camera, wherein the surveillance camera 7 is able to capture video surveillance data from every angle around the sensor housing 31. In other embodiments more than one camera may be utilized to obtain multiple viewing angles.

The surveillance camera 7 can be designed such that the surveillance camera 7 constantly records the surrounding environment of the grounded aircraft, or the processor 41 can be programmed such that the surveillance camera 7 is turned on when an incoming object is detected by the plurality of sensors 40. Once the video surveillance data is captured by the surveillance camera 7 and recorded on the onboard memory device 46, the video surveillance data can be accessed by the user to review any accidents, security issues, etc. In order to access the surveillance data, the electronics assembly 4 further comprises a transceiver 45, wherein the transceiver 45 is electronically connected to the processor 41 as depicted in FIG. 8. The transceiver 45 is synched with a compatible user device, wherein the processor 41 dictates the transfer of the video surveillance data through the transceiver 45 to the compatible user device. The transceiver 45 can also be used to download alarm data from the peripheral alert system 42, wherein the alarm data can also be stored on the onboard memory device 46.

In some embodiments, the transceiver 45 can be used to channel live video streams to the compatible user device, wherein the user is able to monitor the grounded aircraft in real time. As the video surveillance data is captured by the surveillance camera 7, the processor 41 immediately receives the video surveillance data and relays the video surveillance data to the transceiver 45. Additionally, the alarm data can be concurrently relayed in real time. It is also possible for the processor 41 to direct the video surveillance data to the onboard memory device 46 and the transceiver 45 at the same time, wherein the video surveillance data is both stored on the onboard memory device 46 and available to be viewed through a live stream. Furthermore, in other embodiments of the present invention, the surveillance camera 7 may comprise an internal memory device that is used to store the video surveillance data directly on the surveillance camera 7. The surveillance camera 7 can then be detached in order to download the video surveillance data.

In order to power the electronics assembly 4 and the linear actuator 5, a power source 47 is provided, wherein the power source 47 is positioned within the central support 3. The power source 47 is electrically connected to the electronics assembly 4 and the linear actuator 5, wherein the power source 47 provides electrical current that powers the electronics assembly 4 and the linear actuator 5. Additionally, the power source 47 can be used to supply current to the surveillance camera 7 and the activation handle 6 when the surveillance camera 7 or the activation handle 6 are positioned within the adapter slot 32. If the power source 47 is a rechargeable battery, then a charging port is integrated into the central support 3 in order to recharge the power source 47. If the power source 47 in a non-rechargeable battery, then an access panel is integrated into the central support 3 in order to remove and replace the power source 47.

Although the invention has been explained in relation to its preferred embodiment, it is to be understood that many other possible modifications and variations can be made without departing from the spirit and scope of the invention as hereinafter claimed.

What is claimed is:

1. A wing protection system comprises:
   a first wing clamp;
   a second wing clamp;
   a central support;
   an electronics assembly;
   the electronics assembly comprises a plurality of sensors, a processor, and a peripheral alert system;
   the central support comprises a mounting plate and a sensor housing;
   the first wing clamp, the second wing clamp, and the sensor housing being adjacently connected to the mounting plate;
   the first wing clamp and the second wing clamp being positioned opposite each other across the mounting plate;
   the sensor housing being positioned opposite the first wing clamp and the second wing clamp about the mounting plate;
   the plurality of sensors and the peripheral alert system being adjacently connected to the sensor housing; and
   the plurality of sensors and the peripheral alert system being electronically connected to the processor.

2. The wing protection system as claimed in claim 1 comprises:
   the first wing clamp comprises a first arm and a first clamp;
   the first arm being slidably connected to the mounting plate; and
   the first clamp being terminally connected to the first arm opposite the mounting plate.

3. The wing protection system as claimed in claim 2 comprises:
   a linear actuator, a linear sleeve bearing, and a coupler;
   the first arm being slidably positioned within the linear sleeve; and
   the coupler being adjacently connected to the first arm and the linear actuator.

4. The wing protection system as claimed in claim 1 comprises:
   a linear actuator;
   the first wing clamp being slidably coupled with the linear actuator; and
   the linear actuator being electronically connected to the processor.

5. The wing protection system as claimed in claim 1 comprises:
   the second wing clamp comprises a second arm and a second clamp;
   the second arm being adjacently connected to the mounting plate; and
   the second clamp being terminally connected to the second arm opposite the mounting plate.

6. The wing protection system as claimed in claim 1 comprises:
   the peripheral alert system being perimetrically positioned around the sensor housing.

7. The wing protection system as claimed in claim 1 comprises:
   the peripheral alert system being positioned opposite the mounting plate, along the sensor housing.

8. The wing protection system as claimed in claim 1 comprises:
   the plurality of sensors being radially positioned around the sensor housing, wherein the plurality of sensors provides 360 degrees of coverage.

9. The wing protection system as claimed in claim 1 comprises:
   the plurality of sensors being positioned opposite the mounting plate, along the sensor housing.

10. The wing protection system as claimed in claim 1 comprises:
    the electronics assembly further comprises a transceiver; and
    the transceiver being electronically connected to the processor.

11. The wing protection system as claimed in claim 1 comprises:
    an activation handle;
    the sensor housing comprises an adapter slot;
    the activation handle being positioned into the adapter slot; and
    the activation handle being electronically connected to the processor.

12. The wing protection system as claimed in claim 11 comprises:
    the activation handle comprises a shaft, a first control, and a second control;
    the shaft being positioned into the adapter slot; and
    the first control and the second control being integrated into the shaft opposite the adapter slot.

13. The wing protection system as claimed in claim 1 comprises:
    a surveillance camera;
    the sensor housing comprises an adapter slot;
    the surveillance camera being positioned into the adapter slot; and
    the surveillance camera being electronically connected to the processor.

14. The wing protection system as claimed in claim 13, wherein the surveillance camera is a 360-degree camera.

15. The wing protection system as claimed in claim 1 comprises:
    a first actuator switch;
    the first actuator switch being positioned on the sensor housing opposite the mounting plate; and
    the first actuator switch being electronically connected to the processor.

16. The wing protection system as claimed in claim 15 comprises:
    a second actuator switch;

the second actuator switch being positioned on the sensor housing opposite the mounting plate; and the second actuator switch being electronically connected to the processor.

17. The wing protection system as claimed in claim 1, wherein the peripheral alert system includes a warning light.

18. The wing protection system as claimed in claim 1, wherein the peripheral alert system includes an audible alarm.

* * * * *